United States Patent
Kobayashi et al.

(10) Patent No.: US 8,628,610 B2
(45) Date of Patent: *Jan. 14, 2014

(54) DISPERSANT FOR USE IN A CARBON FILLER

(75) Inventors: Nobuyuki Kobayashi, Tokyo (JP); Takanori Sannan, Tokyo (JP); Shinya Tsuchida, Tokyo (JP); Yoshihiko Iijima, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/392,073

(22) PCT Filed: Aug. 24, 2010

(86) PCT No.: PCT/JP2010/064265
§ 371 (c)(1),
(2), (4) Date: Feb. 23, 2012

(87) PCT Pub. No.: WO2011/024800
PCT Pub. Date: Mar. 3, 2011

(65) Prior Publication Data
US 2012/0160128 A1    Jun. 28, 2012

(30) Foreign Application Priority Data
Aug. 27, 2009    (JP) ................ 2009-197036

(51) Int. Cl.
C09C 1/44 (2006.01)
C09K 3/00 (2006.01)
C08L 5/08 (2006.01)
C09D 105/08 (2006.01)

(52) U.S. Cl.
USPC ........ 106/476; 106/217.9; 516/129; 516/203; 516/914

(58) Field of Classification Search
USPC ............ 106/217.9, 476; 516/129, 203, 914
See application file for complete search history.

(56) References Cited

U.S. PATENT DOCUMENTS

| | | | |
|---|---|---|---|
| 5,521,292 A | 5/1996 | Ueda et al. | |
| 2003/0027046 A1 | 2/2003 | Hosokawa et al. | |
| 2004/0130038 A1 | 7/2004 | Murakami et al. | |
| 2005/0225929 A1 | 10/2005 | Murakami et al. | |
| 2006/0222952 A1 | 10/2006 | Kono | |
| 2009/0029255 A1 | 1/2009 | Ohmori | |
| 2009/0257171 A1 | 10/2009 | Yamazaki et al. | |
| 2009/0317718 A1 | 12/2009 | Imachi et al. | |
| 2010/0291306 A1* | 11/2010 | Tsuchida et al. ......... | 427/384 |
| 2011/0043966 A1 | 2/2011 | Kobayashi | |
| 2011/0091771 A1 | 4/2011 | Sannan et al. | |
| 2011/0305970 A1 | 12/2011 | Sahai et al. | |
| 2012/0148917 A1 | 6/2012 | Kobayashi et al. | |
| 2012/0156562 A1 | 6/2012 | Kobayashi et al. | |
| 2012/0156563 A1 | 6/2012 | Kobayashi et al. | |

FOREIGN PATENT DOCUMENTS

| | | |
|---|---|---|
| CN | 101116201 | 1/2008 |
| CN | 101806766 | 8/2010 |
| EP | 1978056 | 10/2008 |
| JP | 63-010456 | 1/1988 |
| JP | 3-285262 | 12/1991 |
| JP | 5-194912 | 8/1993 |
| JP | 9-227633 | 9/1997 |
| JP | 11-297332 | 10/1999 |
| JP | 11-323175 | 11/1999 |
| JP | 2001-6436 | 1/2001 |
| JP | 2002-42817 | 2/2002 |
| JP | 2003-272619 | 9/2003 |
| JP | 2004-186221 | 7/2004 |
| JP | 2005-129437 | 5/2005 |
| JP | 2006-134777 | 5/2006 |
| JP | 2006-286344 | 10/2006 |
| JP | 2006-310010 | 11/2006 |
| JP | 2007-095641 | 4/2007 |
| JP | 2007-224263 | 9/2007 |
| JP | 2008-60060 | 3/2008 |
| JP | 2008-184485 | 8/2008 |
| JP | 2009-26744 | 2/2009 |
| JP | 2009-64564 | 3/2009 |
| JP | 2009-148681 | 7/2009 |
| JP | 2009-170287 | 7/2009 |
| JP | 2009-238720 | 10/2009 |
| JP | 2009-277783 | 11/2009 |
| TW | 200849699 | 12/2008 |
| WO | WO 2007086211 A1 * | 8/2007 |
| WO | WO 2008015828 A1 * | 2/2008 |
| WO | WO2008/123143 | 10/2008 |
| WO | WO 2009/147989 | 12/2009 |

OTHER PUBLICATIONS

Sakamoto et al.: "Processing of Dielectric Ceramic Sheets Using Aqueous Slurries", Materials Integration, 19(5), 25-33 (2006); English Abstract.
Hashimoto et al.: "Electrolyte Thin Film Formation for Solid Oxide Fuel Cells Using Water-based Slurry Contained $Ce_{0.9}Gd_{0.1}O_{1.95}$ Nano-powder", ElectroChemistry, 77(2), 195-198 (2009); English Abstract.
Akatsuka, Yasumasa: "Development Trends of Environment-responsive Epoxy Resins", JETI, 50(9), 103-105 (2002); English Abstract.
Masamune, Kiyoshi: "Environmentally-friendly, Water-based Epoxy Resins", JETI, 50(9), I21-I24 (2002); English Abstract.
Abe et al.: "Charge Transfer Reactions in Li-Ion Batteries" Journal of the Surface Science Society of Japan. 27(10), 609-612 (2006); English Abstract.

(Continued)

Primary Examiner — Anthony J Green
(74) Attorney, Agent, or Firm — Hamre, Schumann, Mueller & Larson, P.C.

(57) ABSTRACT

A carbon filler dispersant for dispersing a carbon filler in a liquid medium comprised of an aqueous solvent or nonaqueous solvent contains, as a principal component, a hydroxylalkyl chitosan, specifically at least one hydroxyalkyl chitosan selected from the group consisting of glycerylated chitosan, hydroxyethyl chitosan, hydroxypropyl chitosan, hydroxybutyl chitosan, and hydroxybutyl hydroxypropyl chitosan.

15 Claims, No Drawings

(56) References Cited

OTHER PUBLICATIONS

Fujiyama: "New Mixing and Dispersion Technology for Conductive Fillers and Measures for Mixing and Dispersion Failures"; Technical Information Institute Co., Ltd. p. 20 (2004); English Abstract.

Joe: "Technological Development of Dispersing Agents for Water Borne Coating Materials" JETI, 44(10), pp. 110-112 (1996); English Abstract.

Kamiya: "Characterization and control of aggregation and dispersion behavior of fine powder in aqueous suspension" 2(1), pp. 54-60; English Abstract, [2002].

Nishina et al.: "Effects of Passivation Film at Aluminum Current Collector of Lithium Ion Secondary Batteries on Charging/Discharging Performance", Battery Technology, 15, 28-40 (2003); English Abstract.

Tachibana: "Preparation, Coating and Drying of Positive Electrode Slurry for Lithium Ion Secondary Cells, and Understanding of Electrode Operations" Technical Information Institute Co., Ltd., 8(12), pp. 72-75 (2009); English Abstract.

Takada, Kazunori: "Improvement of high-rate capability of solid-state lithium-ion battery". Technical Research Report, The Institute of Electronics, Information and Communication Engineers, 107(493), 43-47 (2008); English Abstract.

Yoshitake et al.; SEI Films Obtained by the Addition of Functional Additives to Li-Ion Batteries, Journal of the Surface Finishing Society of Japan, 53(12), 887-889 (2002); English Abstract.

* cited by examiner

DISPERSANT FOR USE IN A CARBON FILLER

TECHNICAL FIELD

This Invention relates to a carbon filler dispersant for dispersing a carbon filler in a liquid medium comprised of an aqueous solvent or nonaqueous solvent. More specifically, this invention has, as an object thereof, the provision of a carbon filler dispersant effective for providing a carbon filler-containing composite material, which contains a carbon filler uniformly dispersed in a solution and is useful as various coating formulations applicable in industrial fields of paints, inks, coating materials, magnetic materials, ceramics and electricity storage devices.

BACKGROUND ART

Carbon fillers are used as color pigments for plastics, textiles, paints and the like, centering around applications as reinforcing fillers for rubber products. Attempts have also been being made to apply them in IC trays, electronic parts materials and the like, as their mixing in plastics makes it possible to impart electrical conductivity. In recent years, their applications have also been under study in various fields, including studies on carbon nanotube thin films as replacements for transparent electrodes (ITO films) in FPDs (flat panel displays) such as liquid crystal panels and organic EL panels.

A carbon filler generally features small primary particles and high cohesive power, and therefore, is a material that can be hardly dispersed uniformly. There is, accordingly, an outstanding demand for a dispersant that enables more uniform dispersion. In particular, the uniform dispersion of a carbon filler in an aqueous solvent containing water and a hydrophilic organic solvent is difficult, because the carbon filler is hydrophobic at surfaces thereof and hence has low surface energy and poor wettability to the aqueous solvent.

A variety of problems arise unless the dispersion state of a carbon filler is uniform. In applications such as paints and printing inks, there is a problem that neither vividness nor gloss can be obtained as intended. Especially in the application to electrically conductive materials, an adequate conductive network can be hardly formed to possibly produce inconvenience in a fundamental characteristic such that an intended electrical resistance cannot be reached. For allowing a carbon filler to fully exhibit its functionality, it thus becomes necessary that the state of a slurry is appropriate for the exhibition of the functionality, specifically that the carbon filler is uniformly and stably dispersed in the slurry.

Choosing adequate solvents with a focus being centered around the dispersibility of a carbon filler, nonaqueous (organic-solvent-based) solvents (dispersion media), which are excellent in the uniform dispersibility of the carbon filler, show high adhesive force and can be readily dried, are overwhelmingly advantageous as solvents (dispersion media) for the slurry. As a matter of fact, nonaqueous solvents have hence been used widely (see Non-patent Documents 1 and 2, etc.).

However, nonaqueous organic solvents are not only volatile and high in environmental load but are also required to take genotoxicity into consideration, and therefore, still involve problems in safety and workability. It is hence desired to use them in reduced amounts. In recent years, there is an increasing concern about the protection of environment and the prevention of health hazards in many industrial fields (Non-patent Document 3), leading to increasing demands for measures toward VOC reductions, solventless coating and the like in connection with the use of nonaqueous organic solvents involving such problems as described above. It is, accordingly, required to switch to products that are friendly to the environment and people (Non-patent Publication 4).

Those which are attracting the greatest attention as products friendly to the environment and people are water-based products, which are expected to become part of solventless products. Various problems, however, arise if water is used as a solvent in place of an organic solvent in a slurry that contains a carbon filler. In a water-based slurry, for example, carbon filler particles tend to agglomerate in the slurry when they are in a charged state, and moreover, they are prone to settling due to a large difference in specific gravity between the solvent and the solute, thereby raising a problem in that their uniform dispersion is very difficult (Non-patent Document 1).

There is, accordingly, an urgent need to take measures for the assurance of good dispersion for a carbon filler. As general measures to cope with dispersion failures, addition of a dispersant, surface treatment or microencapsulation of a carbon filler, introduction of polar groups into a polymer, and the like can be contemplated. In fact, proposed as to the addition of a dispersant include the attempt to use a water-soluble, amphoteric dispersant for a slurry composition that contains a microparticulated black inorganic oxide useful in paints, inks, rubbers and plastics, electronic materials and the like (Patent Document 1) and the attempt to use a compound having one or more basic functional groups in an composition for cells, which contains a conductive aid (Patent Document 2). Concerning the application of surface treatment to a carbon filler, there are proposals about carbon black with a surface acidity increased by performing gas-phase oxidation treatment such as ozone treatment or plasma treatment or liquid-phase oxidation treatment with hydrogen peroxide solution, sodium perchlorate or the like such that hydrophilic functional groups such as carboxyl groups or hydroxyl groups are introduced onto the surfaces of the carbon black (Patent Documents 3 and 4).

Other proposals include the conversion of a conductive filler into a microencapsulated conductive filler by forming an insulating resin on the surfaces of the conductive filler, and further, an anisotropic conductive resin composition containing a polymer having polar groups and a conductive filler.

However, the dispersion media used in these proposals are primarily organic solvents, and water-based media are used only in a very small number of cases. The carbon black with the hydrophilic functional groups introduced by the surface treatment is provided with increased wettability to an aqueous solvent, and improvements are observed in its water dispersibility. However, the hydrophilic functional groups so introduced act as a disincentive for electrical conductivity so that limitations are imposed including its unsuited use in application fields where electrical conductivity is intended. It is, therefore, strongly desired to develop a method that uses a water-based slurry, which, even if a nonaqueous organic solvent is used, contains the nonaqueous organic solvent in a small proportion, is friendly to the environment, is low cost and is high in safety, and that can uniformly disperse a carbon filler.

Upon attempting the dispersion stabilization of a slurry with a carbon filler dispersed in an aqueous solvent, the use of the above-described, respective methods for organic solvents may be contemplated. Among them, the method involving "the addition of a dispersant" is advantageous when the simplification of the production process and coating system and the cost mat ter are taken into account. As a dispersant for use in a water-based slurry, it is possible to mention a polycarboxylate salt or phosphate amine salt used in the field of paints, a polyacrylamide as a high-molecular dispersant, or the like. When a reduction in environmental load is taken into consideration, however, preferred is a substance of natural origin for its friendliness to the environment. As such a natural substance, it has been proposed to use carboxymethylcellulose as a water-based dispersant upon production of each electrode for a nonaqueous electrolyte secondary cell (Patent Document 4). However, there is still a room for an improvement in its dispersing effect.

PRIOR ART DOCUMENTS

Patent Documents

Patent Document 1: JP-A-2009-148681
Patent Document 2: JP-A-2009-26744
Patent Document 3: JP-A-11-323175
Patent Document 4: JP-A-2009-238720

Non-Patent Documents

Non-patent Document 1: SAKAMOTO, Wataru; HIRANO, Shin-ichi: "Processing of Dielectric Ceramic Sheets Using Aqueous Slurries" in Japanese, Materials Integration, 19(5), 25-33 (2006)
Non-patent Document 2: HASHIMOTO, Shin-ichi; MORI, Masashi: "Electrolyte Thin Film Formation for Solid Oxide Fuel Cells Using Water-based Slurry Contained $Ce_{0.9}Gd_{0.1}O_{1.95}$ Nano-powder", ElectroChemistry, 77(2), 195-198 (2009)
Non-patent Document 3: AKATSUKA, Yasumasa: "Development Trends of Environment-responsive Epoxy Resins" in Japanese, JETI, 50(9), 103-105 (2002)
Non-patent Document 4: MASAMUNE, Kiyoshi: "Environmentally-friendly, Water-based Epoxy Resins" in Japanese, JETI, 50(9), 121-124 (2002)

DISCLOSURE OF THE INVENTION

Problem to be Solved by the Invention

The present invention has been made with the foregoing circumstances in view. Therefore, an object of the present invention is to provide a novel dispersant, which can solve the above-described problems of the conventional technologies and which can provide a carbon filler in a liquid medium, especially in an aqueous solvent with good dispersibility and moreover, can also function as a binder for the carbon filler although it is a naturally-occurring substance that is friendly to the environment. Another object of the present invention is to enable the provision of a slurry, which contains a carbon filler uniformly dispersed therein, is excellent in dispersion properties and storage stability, and is usable in many fields such as paints, inks, toners, rubbers and plastics, ceramics, magnetic materials, adhesives, cells, electronic materials and liquid-crystal color filters, and is to contribute to the protection of environment and the prevention of health hazards, both of which have become objects of public concern in recent years.

Means for Solving the Problem

The above-described objects can be achieved by the present invention to be described below. Described specifically, the present invention provides a carbon filler dispersant for dispersing a carbon filler in a liquid medium comprised of an aqueous solvent or nonaqueous solvent, which comprises a hydroxyalkyl chitosan as a principal component.

As preferred embodiments of the carbon filler dispersant according to the present invention, the carbon filler dispersants to be described hereinafter can be mentioned. The hydroxyalkyl chitosan may comprise at least one hydroxyalkyl chitosan selected from the group consisting of glycerylated chitosan, hydroxyethyl chitosan, hydroxypropyl chitosan, hydroxybutyl chitosan, and hydroxybutyl hydroxypropyl chitosan. The hydroxyalkyl chitosan may have a weight average molecular weight of from 2,000 to 350,000. The hydroxyalkyl chitosan may have a hydroxyalkylation degree of 0.5 or higher but 4 or lower. The carbon filler dispersant may further comprise, as an additive, an organic acid or a derivative thereof in an amount of from 0.2 to 3 parts by mass per parts by mass of the hydroxyalkyl chitosan. The carbon filler may comprise at least one carbon filler selected from the group consisting of carbon black, acetylene black, Ketjenblack, furnace black, natural graphite, artificial graphite, amorphous carbon, hard carbon, soft carbon, activated carbon, carbon nanofibers, carbon nanotubes and fullerene.

Advantageous Effects of the Invention

According to the present invention, a novel dispersant is provided. This novel dispersant can provide a carbon filler in a liquid medium, especially in an aqueous solvent with good dispersibility although it is a naturally-occurring substance that is friendly to the environment. Further, the present invention enables the provision of a slurry, more specifically a coating formulation, which contains a carbon filler uniformly dispersed therein, is excellent in dispersion properties and storage stability, and is usable in many fields such as paints, inks, toners, rubbers and plastics, ceramics, magnetic materials, adhesives, cells, electronic materials and liquid-crystal color filters, thereby making it possible to contribute to the protection of environment and the prevention of health hazards, both of which have become objects of public concern in recent years. Described specifically, the present invention makes it possible to obtain a slurry in which a carbon filler is uniformly dispersed with the dispersant of the present invention in a liquid medium, thereby enabling to realize a coating formulation in which the carbon filler equipped with high dispersibility and dispersion stability is dispersed. Because this substance functions as a dispersant, and at the same time, is a binder for the carbon filler or is a natural polymer having film-forming ability, a coating treatment with the coating formulation containing the dispersant enables to form a carbon filler-containing composite material with the carbon filler effectively dispersed therein. As the carbon filler is uniformly dispersed in the composite material, the functionality which the carbon filler is equipped with can be fully exhibited. Especially by applying the coating formulation, in which the carbon filler is uniformly dispersed with the dispersant of the present invention, to various substrates such as metals, resins, ceramics and collectors for electricity storage devices, it is possible to obtain conductive composite materials of excellent performance that the conductivity which the carbon filler has is effectively exhibited.

MODES FOR CARRYING OUT THE INVENTION

As a result of enthusiastic research conducted to achieve the above-described objects, the present inventors found that a hydroxyalkyl chitosan, which is a substance derived from a natural product, exhibits a high dispersing function for a carbon filler in a liquid medium formed of an aqueous solvent or nonaqueous solvent, especially an aqueous solvent although it is a natural polymer having film-forming ability, leading to the present invention. Described specifically, the present inventors found that the addition of a hydroxyalkyl chitosan to a slurry in a liquid medium formed of an aqueous solvent or nonaqueous solvent can provide the slurry with an adequate viscosity, can effectively prevent settling-out of the carbon filler, and can solve such problems of the conventional technologies as described above, leading to the completion of the present invention.

The present invention will next be described in further detail based on best modes for carrying out the invention.

The dispersant according to the present invention is a dispersant for dispersing a carbon filler in a liquid medium comprised of an aqueous solvent or nonaqueous solvent, and is characterized in that it contains a hydroxyalkyl chitosan as a principal component. The dispersant according to the present invention is useful for dispersing a carbon filler especially in water or a water-based, mixed liquid medium of water and an organic solvent, miscible with water. In the dispersant according to the present invention, the principal component that exhibits dispersing effects for the carbon filler is a hydroxyalkyl chitosan, which is a natural polymer that does not add much load on the environment. In the present invention, the hydroxyalkyl chitosan may preferably comprise at least one hydroxyalkyl chitosan selected especially from the group consisting of glycerylated chitosan, hydroxyethyl chitosan, hydroxypropyl chitosan, hydroxybutyl chitosan, and hydroxybutyl hydroxypropyl chitosan.

The hydroxyalkyl chitosan that characterizes the present invention has a structure that an alkylene oxide or oxiranemethanol is added to the amino group of chitosan, and one produced by reacting chitosan with the alkylene oxide or oxiranemethanol is preferred. It is, however, to be noted that the hydroxyalkyl chitosan for use in the present invention is not limited to such a hydroxyalkyl chitosan and a hydroxyalkyl chitosan produced by another process can also be used likewise. As the above-described alkylene oxide or oxiranemethanol, a single alkylene oxide or oxiranemethanol may be used, or plural alkylene oxides or oxiranemethanols may be used in combination.

When producing a hydroxyalkyl chitosan for use in the present invention by reacting chitosan and the corresponding alkylene oxide, hydroxybutyl chitosan, for example, can be obtained by first dispersing chitosan in a water-containing isopropyl alcohol or the like under stirring, adding sodium hydroxide and butylene oxide to the dispersion, and then stirring the resulting mixture under heat.

When producing glycerylated chitosan for use in the present invention by reacting chitosan and the corresponding oxiranemethanol, on the other hand, the glycerylated chitosan can be obtained by dispersing chitosan beforehand, for example, in water-containing isopropyl alcohol or the like under stirring, adding the oxiranemethanol to the dispersion, and then stirring the resulting mixture under heat.

As the hydroxyalkyl chitosan for use in the present invention, a hydroxyalkyl chitosan having a hydroxyalkylation degree in a range of 0.5 or greater but 4 or smaller can be suitably used from the standpoint of the dispersing ability for the carbon filler. The term "hydroxyalkylation degree (no unit)" means the degree of addition of a corresponding alkylene oxide or oxiranemethanol to chitosan. Described specifically, it is preferred in the present invention that the hydroxylation degree is 0.5 mole or greater but 4 moles or smaller per pyranose ring (mole of pyranose) that makes up chitosan. To obtain such a hydroxyalkylation degree, it is desired to add and react 0.6 mole or greater but 10 moles or smaller of the alkylene oxide or oxiranemethanol per pyranose ring (mole of pyranose) that makes up chitosan. If the hydroxylation degree of a hydroxyalkyl chitosan to be used is 0.5 or smaller, the hydroxyalkyl chitosan is insufficient from the standpoints of the dispersing ability for the carbon filler and the stability of a slurry after dispersion. Even when the hydroxylation degree exceeds 4, on the other hand, the dispersing ability for the carbon filler does not change so that the setting of the hydroxyalkylation degree beyond 4 is uneconomical.

Further, it is preferred in the present invention to use a hydroxyalkyl chitosan having a weight average molecular weight in a range of 2,000 or higher but 350,000 or lower, especially a hydroxyalkyl chitosan having a weight average molecular weight of 5,000 or higher but 250,000 or lower. A weight average molecular weight lower than 2,000 is not preferred in that the hydroxyalkyl chitosan is insufficient in the dispersing ability for the carbon filler. A weight average molecular weight higher than 350,000, on the other hand, is not preferred either in that it provides the dispersant with an increased viscosity and that, when a dispersion such as a slurry is prepared using the dispersant, the solids concentration of the carbon filler in the dispersion can be hardly raised.

The dispersant according to the present invention contains as a principal component such a hydroxyalkyl chitosan as described above, and to the principal component, an organic acid or a derivative thereof may be added further. Depending on the method of production of the dispersant according to the present invention or the manner of its use, it may be preferred to add an organic acid or a derivative for the purpose of providing the dispersant with increased solubility to a liquid medium, for example, when the hydroxyalkylation degree of the hydroxyalkyl chitosan is smaller than 1. The organic acid may be added in an amount of from 0.2 to 3 parts by mass per parts by mass of the hydroxyalkyl chitosan. As will be described subsequently herein, the use of a dibasic or higher, especially a tribasic or higher polybasic acid as an organic acid upon preparing a coating formulation by using the dispersant according to the present invention allows the hydroxyalkyl chitosan as the dispersant to crosslink so that the hydroxyalkyl chitosan exhibits film-forming ability. In this respect, a detailed description will be made.

The dispersant according to the present invention, which has such a constitution as described above, is useful in preparing a coating formulation by dispersing and incorporating a carbon filler in an aqueous solvent comprised of water and/or a hydrophilic organic solvent or a liquid medium such as a nonaqueous, polar solvent. Further, the application of the coating formulation, for example, to various products can provide composite materials with uniform electrical conductivity imparted thereto. In particular, the dispersant according to the present invention can disperse a carbon filler well in an aqueous solvent, and therefore, is also useful from the viewpoints of the protection of environment and the prevention of health hazards. From such viewpoints, it is preferred to use, as a liquid medium for use in the present invention, water or a mixed medium comprised of water and/or an organic solvent miscible with water. The dispersant according to the present invention may be formulated preferably into the form of a solution of at least a hydroxyalkyl chitosan dissolved in such a liquid medium.

A description will now be made about the carbon filler as an object to be dispersed and bound together with the hydroxyalkyl chitosan as the principal component in the above-described dispersant according to the present invention. As the carbon filler to be used in the present invention, those in the forms of particles, flakes and short fibers are all usable. Particulate carbon fillers include carbon black, acetylene black, Ketjenblack, furnace black, and the like. Flaky carbon fillers include natural graphite, kish graphite, artificial (man-made) graphite, and the like. Carbon fillers in the form of short fibers include PAN-based carbon fibers, pitch-based carbon fibers, carbon nanofibers, carbon nanotubes, and the like. As more suitably usable carbon fillers, carbon black, acetylene black, Ketjenblack, furnace black, natural graphite, artificial (man-made) graphite, kish graphite, amorphous carbon, hard carbon, soft carbon, activated carbon, carbon nanofibers, carbon nanotubes, fullerene and the like can be mentioned. Upon preparing a coating formulation by dispersing a carbon filler in a liquid medium with the dispersant according to the present invention, the carbon filler may be used in an amount of usually from 0.01 to 30 parts by mass or so, more preferably from 1 to 20 parts by mass, per 100 parts by mass of the coating formulation. The dispersant according to the present invention may be used in such an amount that in terms of a relationship between the hydroxyalkyl chitosan as the principal component and the carbon filler, the hydroxyalkyl chitosan amounts to preferably from 0.1 to 10 parts by mass, more preferably from 0.5 to 5 parts by mass or so per parts by mass of the carbon filler.

If the content of the carbon filler in the coating formulation is smaller than 0.01 parts by mass, the resulting composite material with the carbon filler contained therein may become insufficient in functions such as coloring power and conductivity, although it varies depending on the application purpose of the coating formulation. If the content of the carbon filler is greater than 30 parts by mass, on the other hand, one or more of the remaining components may become insufficient so that the resulting composite material may be reduced in other performance required to the composite material. Contents of the carbon filler outside the above-described range are not preferred accordingly.

As the aqueous solvent (water-based dispersion medium) usable in the dispersant of the present invention in the form of a solution and also in a carbon filler-dispersed composite material such as a coating formulation as provided by the dispersant of the present invention, water can be mentioned. Besides, a mixed dispersion medium of an organic solvent miscible with water and water can be also used suitably. As the organic solvent miscible with water, conventionally-known organic solvents can be used. Examples include alcohols such as methyl alcohol, ethyl alcohol, n-propyl alcohol, isopropyl alcohol (IPA), n-butyl alcohol, s-butyl alcohol, isobutyl alcohol and t-butyl alcohol; esters such as methyl acetate, ethyl acetate, n-propyl acetate, isopropyl acetate, n-butyl acetate, isobutyl acetate, methoxybutyl acetate, cellosolve acetate, amyl acetate, methyl lactate, ethyl lactate and butyl lactate; ketones such as acetone, methyl ethyl ketone, methyl isobutyl ketone, diisobutyl ketone and cyclohexanone; amides such as N-methyl-2-pyrrolidone, N,N-dimethylacetamide and N,N-dimethylformamide; and sulfoxides such as dimethyl sulfoxide. Among these, the alcohols are suitably usable, with IPA being usable especially suitably. These water-miscible, organic solvents may be used either singly or as a mixture.

When a mixed organic solvent/water medium containing an organic solvent miscible with water is used in the solution-form dispersant of the present invention or the carbon filler-dispersed composite material such as the coating formulation as provided by the dispersant of the present invention, the content of the organic solvent in the water-based mixed dispersion medium (100 mass %) may be set as desired in a range of from 1 to 99 mass %, with a mixed dispersion medium with the organic solvent contained in a range of from 5 to 60 mass % being more suitably usable. When a mixed dispersion medium of IPA/water is used, for example, the content of IPA may be set preferably at from 1 to 40 mass %, with a mixed dispersion medium containing from 5 to 40 mass % of IPA being more preferred.

As a suitable makeup of the carbon filler-dispersed coating formulation that contains the dispersant of the present invention, the contents of the hydroxyalkyl chitosan and carbon filler may be, for example, from 0.02 to 20 parts by mass and 0.01 to 30 parts by mass, respectively, in 100 parts by mass of the carbon filler-dispersed coating formulation.

When preparing a coating formulation by using the dispersant of the present invention, the use of a dibasic or higher, especially a tribasic or higher polybasic acid as an organic acid, which is an additive to the dispersant, allows, the hydroxyalkyl chitosan as a principal component of the dispersant to crosslink so that film-forming ability is exhibited. The organic acid and/or its derivative may be added as a makeup component in the coating formulation although it may be added as an additive to a liquid-form dispersant such that the hydroxyalkyl chitosan is provided with higher solubility. In the coating formulation, another resin component may also be used as a film-forming component as needed in addition to the hydroxyalkyl chitosan which functions as a film-forming component. By using a coating formulation (carbon filler-containing composite material) of the makeup that such an organic-acid and/or derivative thereof and the hydroxyalkyl chitosan are contained, a coating film of excellent adhesiveness and solvent resistance can be formed. As a reason for this, the organic acid and/or its derivative acts as a crosslinking agent for the hydroxyalkyl chitosan and also for the resin component, which may be added as desired, during drying under heat after the coating application, thereby making it possible to form a carbon filler-containing coating film with excellent adhesiveness to the surface of a substrate, especially a metal material and superb solvent resistance.

As the organic acid or its derivative for use in the present invention, one known to date can be used. Usable examples include organic acids themselves and acid anhydrides thereof; salts, notably ammonium salts and amine salts of some or all of the carboxyl groups of such organic acids; alkyl esters, amides, imides and amide-imides of some or all of the carboxyl groups of polybasic acids; derivatives obtained by modifying ones or more of the carboxyl groups of these compounds with N-hydroxysuccinimide, N-hydroxysulfosuccinimide or a derivative thereof; and the like. Preferred as derivatives of these organic acids are compounds which regenerate organic acids upon heating of carbon filler-containing composite materials to be formed subsequently.

As organic acids preferably usable in the present invention from the standpoint of crosslinking ability for the hydroxyalkyl chitosan that constitutes the dispersant, dibasic or higher, especially tribasic or higher polybasic acids can be mentioned, including citric acid, 1,2,3-propanetricarboxylic acid, 1,2,4-cyclohexanetricarboxylic acid, 1,2,4,5-cyclohexanetetracarboxylic acid, 1,2,3,4-butanetetracarboxylic acid, trimellitic acid, pyromellitic acid, ethylenediaminetetraacetic acid, 1,4,5,8-naphthalenetetracarboxylic acid, and 1,2,3,4,5,6-cyclohexanehexacarboxylic acid; and their anhydrides.

The content of the organic acid or its derivative in the present invention may be preferably from 0.2 to 3 parts by mass, notably from 0.5 to 2 parts by mass per parts by mass of the hydroxyalkyl chitosan as the principal component of the dispersant. In the case of the coating formulation containing the dispersant according to the present invention, on the other hand, the content of the organic acid and/or its derivative per 100 parts by mass of the coating formulation may be preferably from 0.01 to 20 parts by mass, notably from 0.02 to 10 parts by mass. If the content of the organic acid or its derivative is lower than 0.01 mass % in this instance, the resulting carbon filler-containing, composite material is insufficient in the adhesiveness to a substrate and the insolubility and non-swellability to organic solvents. Such an excessively low, content is thus not preferred. On the other hand, a content higher than 20 mass % provides the resulting film or carbon filler-containing composite material with reduced flexibility, and moreover, is uneconomical. Such an unduly high content is hence not preferred either.

When it is desired to provide the coating film with physical strength, durability, abrasion resistance, adhesiveness to substrates, and the like, one or more resin components other than the hydroxyalkyl chitosan can be added, as binder(s) for the coating film, in the carbon filler-dispersed coating formulation which contains the dispersant of the present invention. As such resin components usable in the carbon filler-dispersed coating formulation, conventionally-known resins can be mentioned, including polyvinyl alcohol, fluorine-containing macromolecules, cellulose-based macromolecules, starch-based macromolecules, styrene-based polymers, acrylic polymers, styrene-acrylate ester copolymers, polyamides, polyimides and polyamide-imides. These resin components are available from the market, and can be used as they are. It is, however, necessary to make a suitable selection or adjustment as needed depending on the dispersion medium to be used. In the case of a water-based dispersion medium, for example, the use of a resin having hydrophilic groups such as carboxyl groups is needed.

The content of such a resin component in the carbon filler-dispersed coating formulation with the dispersant of the present invention contained therein may be preferably from 0.1 to 20 parts by mass, notably from 0.5 to 10 parts by mass per parts by mass of the hydroxyalkyl chitosan as the principal component in the dispersant of the present invention. Further, the total content of the resin components including the hydroxyalkyl chitosan in 100 parts by mass of the carbon filler-dispersed coating formulation may range preferably from 1 to 40 parts by mass, more preferably from 2 to 20 parts by mass in terms of solids content. In this instance, a total content of the resin components lower than 1 parts by mass provides the resulting, carbon filler-containing composite material with insufficient strength and insufficient adhesiveness to a substrate so that the components of the coating film tend to fall off from the coating film layer. Such an unduly low total content is not preferred accordingly. A total content of the resin components higher than 40 parts by mass, on the other hand, makes it difficult to obtain a uniform solution, and moreover, the carbon filler as a dispersoid is covered under the resin components so that the function which the carbon filler has may not be exhibited fully. Such an excessively high total content is hence not preferred either.

As the organic acid and/or its derivative and the organic solvent for use in the present invention, those commonly available on the market can be used as they are, or may be used after purification as needed. As the order of addition of polymers such as the hydroxyalkyl chitosan and one or more resin components and the organic acid and/or its derivative upon their dissolution in the liquid medium comprised of the aqueous solvent or nonaqueous solvent in the preparation of the carbon filler-dispersed coating formulation containing the dispersant of the present invention, either of the polymers including the hydroxyalkyl chitosan and the organic acid and/or its derivative may be added first or both of them may be added concurrently. As a dissolution method, room-temperature stirring is sufficient, but heating may also be conducted as needed.

The carbon filler-dispersed coating formulation with the dispersant of the present invention contained therein can be obtained by adding the dispersant of the present invention, which contains the hydroxyalkyl chitosan as a principal component, and the carbon filler, and further, the one or more resin components and organic acid as reinforcement components for the coating film as needed, to the liquid medium comprised of the aqueous solvent or nonaqueous solvent, and mixing the resulting mixture. As the proportions of the respective components in the coating formulation, it is particularly preferred, for example, that, when the coating formulation is assumed to be 100 parts by mass, the hydroxyalkyl chitosan amounts to from 0.02 to 20 parts by mass, the carbon filler amounts to 0.01 to 30 parts by mass, the one or more other resin components amount to from 1 to 20 parts by mass, and the organic acid and/or its derivative amounts to from 0.02 to 20 parts by mass. Further, the solids content of the coating formulation may range preferably from 0.05 to 50 mass %.

The carbon filler-dispersed formulation according to the present invention can also contain one or more optional components other than the above-described components, for example, one or more of other crosslinking agents and the like. Examples of the other cross linking agents include epoxy compounds such as ethylene glycol diglycidyl ether, polyethylene glycol diglycidyl ether and glycerol polyglycidyl ether; isocyanate compounds such as toluoylene diisocyanate, xylylene diisocyanate, hexamethylene diisocyanate and phenyl diisocyanate, and blocked isocyanate compounds formed by blocking such isocyanate compounds with blocking agents such as phenols, alcohols, active methylene compounds, mercaptans, acid-amides, imides, amines, imidazoles, ureas, carbamic acids, imines, oximes or sulfites; and aldehyde compounds such as glyoxal, glutaraldehyde, and dialdehyde starch.

Also included are (meth)acrylate compounds such as polyethylene glycol diacrylate, polyethylene glycol dimethacrylate and hexanediol diacrylate; methylol compounds such as methylolmelamine and dimethylol urea; organic acid metal salts such as zirconyl acetate, zirconyl carbonate and titanium lactate; and metal alkoxide compounds such as aluminum trimethoxide, aluminumtributoxide, titanium tetraethoxide, titanium tetrabutoxide, zirconium tetrabutoxide, aluminum dipropoxide acethylacetonate, titanium dimethoxide bis(acetylacetonate) and titanium dibutoxide bis(ethylacetoacetate).

Further included are silane coupling agents such as vinylmethoxysilane, vinylethoxysilane, 3-glycidoxypropyltrimethoxysilane, 3-glycidoxypropyltriethoxysilane, 3-methacryloxypropyltrimethoxysilane, 3-aminopropyltrimethoxysilane, 3-aminopropyltriethoxysilane, 3-isocyanatopropyltriethoxysilane and imidazolesilane; silane compounds such as methyltrimethoxysilane, tetraethoxysilane and methyltriethoxysilane; and carbodiimide compounds and the like. The use of these crosslinking agents is not essential. When they are used, however, the content of one or more of such crosslinking agents may suitably range from 0.01 to 200 parts by mass when the content of the hydroxyalkyl chitosan as the principal component of the dispersant plus the content of the one or more other resin components is assumed to be 100 parts by mass.

A description will hereinafter be made about a specific method for the preparation of the carbon filler-dispersed coating formulation with the dispersant of the present invention contained therein. First, the coating formulation is prepared by adding the hydroxyalkyl chitosan as a dispersant, the carbon filler, the organic acid, and the other resin component or components to the water-based dispersion medium such that they are proportioned as described above, and mixing and dispersing them in a conventionally-known mixer. As the mixer, a ball mill, sand mill, pigment disperser, mix-muller, ultrasonic disperser, homogenizer, planetary mixer, Hobart mixer, or the like can be used. Also preferred is a method that firstly mixes the carbon filler in a mixer such as a mix-muller, planetary mixer, Henschel mixer or omni-mixer, adds the hydroxyalkyl chitosan, the other resin component or components, and the organic acid, and then mixes them until homogeneous. The adoption of such a method makes it possible to readily obtain a uniform coating formulation.

No particular limitation is imposed on the amounts of the coating formulation upon its application onto various substrates. In general, however, the coating formulation may be applied in such an amount that the carbon filler-containing composite material to be formed subsequent to drying will have a thickness of usually from 0.05 to 100 µm, preferably from 0.1 to 10 µm.

The carbon filler-containing composite material is provided by applying the carbon filler-dispersed coating formulation, which contains the dispersant of the present invention, onto a surface of a substrate and drying the same. As the substrate to be used upon the above-described application, a metal such as aluminum or copper, glass, a natural resin, a synthetic resin, ceramics, paper, fibers, a woven fabric, a nonwoven fabric, a leather or the like can be mentioned.

In the carbon filler-containing composite material obtained as described above, the coating film layer, which is made of the carbon filler uniformly dispersed in a good state with the hydroxyalkyl chitosan as the dispersant and the polymers such as the hydroxyalkyl chitosan and one or more other resin components crosslinked with the organic acid, is formed and arranged on the substrate, and the coating film layer is equipped with such properties as described above.

EXAMPLES

The present invention will next be described more specifically based on examples and comparative examples. It is to be noted that all designations of "parts" or "%" in the following examples and comparative examples are on a mass basis. It is also to be noted that the present invention shall not be limited by these examples.

<Various Dispersants>

The compositions of the dispersants of the examples and comparative example are shown in Table 1. The hydroxyalkyl chitosans used as principal components in the respective dispersants will be abbreviated as follows:
Hydroxyethyl chitosan: HEC
Hydroxypropyl chitosan: HPC
Hydroxybutyl chitosan: HBC
Hydroxybutyl hydroxypropyl chitosan: HBPC
Glycerylated chitosan: DHPC
The organic acids and organic solvents used as additive components will be abbreviated as follows:
1,2,3-Propanetricarboxylic acid: PTC
1,2,3,4-Butanetetracarboxylic acid: BTC
Methyl alcohol: MeOH
Ethyl alcohol: EtOH
Isopropyl alcohol: IPA
N-Methyl-2-pyrrolidone: NMP Example 1

DHPC (5 parts), which had a hydroxyalkylation degree (hereinafter "the HA modification degree") of 0.6 and a weight average molecular weight (MW) of 50,000, was dispersed as a hydroxyalkyl chitosan in deionized water (90 parts). Subsequent to the addition of BTC (5 parts) as an organic acid to the thus-obtained dispersion, the resulting mixture was stirred at room temperature for 4 hours to achieve dissolution, so that a dispersant (100 parts) was prepared in the form of an aqueous solution.

Examples 2 to 10

The liquid-form dispersants of Examples 2 to 10 were prepared in a similar manner as in Example 1 except that the kind, HA modification degree, MW and content (mass) of the hydroxyalkyl chitosan, the kind and content of the organic acid and the kind and content of the liquid medium were varied as shown in Table 1.

Comparative Example 1

Chitosan (HA modification degree: 0.0, MW: 100,000) (5 parts) was dispersed in deionized water (87 parts). Subsequent to the addition of citric acid (8 parts) to the thus-obtained dispersion, the resulting mixture was stirred at room temperature for 4 hours to achieve dissolution, so that the dispersant (100 parts) of Comparative Example 1 was prepared in the form of an aqueous solution.

TABLE 1

Water-based Dispersants

| | Hydroxyalkyl chitosan | | | | Organic acid | | Liquid medium | |
|---|---|---|---|---|---|---|---|---|
| | Kind | HA modf. deg. | MW | Mass | Kind | Mass | Kind | Mass |
| Ex. 1 | DHPC | 0.6 | 50,000 | 5 | BTC | 5 | Water | 90 |
| Ex. 2 | DHPC | 1.1 | 80,000 | 10 | BTC | 10 | Water | 80 |
| Ex. 3 | DHPC | 2.3 | 160,000 | 5 | PTC | 5 | Water/IPA (7/3) | 90 |
| Ex. 4 | DHPC | 3.7 | 230,000 | 3 | Pyromellitic acid | 5 | Water/NMP (3/7) | 92 |
| Ex. 5 | DHPC | 1.5 | 12,000 | 10 | Citric acid | 5 | Water | 85 |
| Ex. 6 | DHPC | 0.9 | 5,000 | 10 | BTC | 5 | Water | 85 |
| Ex. 7 | HEC | 1.0 | 70,000 | 5 | BTC | 10 | Water/MeOH (5/5) | 85 |
| Ex. 8 | HPC | 1.2 | 60,000 | 10 | BTC | 10 | Water/EtOH (8/2) | 80 |

TABLE 1-continued

| | Water-based Dispersants | | | | | | | |
|---|---|---|---|---|---|---|---|---|
| | Hydroxyalkyl chitosan | | | | Organic acid | | Liquid medium | |
| | HA | | | | | | | |
| | Kind | modf. deg. | MW | Mass | Kind | Mass | Kind | Mass |
| Ex. 9 | HBC | 1.5 | 90,000 | 5 | Pyromellitic acid | 5 | Water/IPA (6/4) | 90 |
| Ex. 10 | HBPC | 1.1 | 130,000 | 5 | Pyromellitic acid | 5 | Water/IPA (9/1) | 90 |
| Comp. Ex. 1 | Chitosan | | 100,000 | 5 | Citric acid | 8 | Water | 87 |

Preparation and Evaluation of Carbon Filler-Dispersed Coating Formulations

Working Application Example 1

The dispersant of Example 3 prepared in the form of the aqueous solution as described above was used. A carbon filler-dispersed coating formulation was prepared by dispersing a carbon filler in the solution as will be described hereinafter. As the carbon filler for the above-described preparation, furnace black ("TOKA BLACK #4500", product of Tokai Carbon Co., Ltd.) was provided. The furnace black (10 parts) and the dispersant of Example 3, which had been prepared beforehand, were then stirred and mixed at a mixing ratio of 10 parts to 90 parts at a rotational speed of 60 rpm for 120 minutes in a planetary mixer to obtain the carbon filler-dispersed coating formulation.

(Evaluation of Dispersibility)

The carbon filler-dispersed coating formulation obtained as described above was applied and spread on a glass plate by a bar coater No. 6. The appearance of the resulting coating film was visually examined to evaluate the dispersibility of the carbon filler. Dispersibility was evaluated as "good" when a coating film was uniform and neither of seeding, streaks and irregularities were observed, while dispersibility was evaluated as "bad" when seeding, streaks and/or irregularities were observed in a coating film. The evaluation results are shown in Table 2.

(Evaluation of Storage Stability)

The storage stability of the carbon filler-dispersed coating formulation obtained as described above was evaluated by the below-described method. The carbon filler-dispersed coating formulation was placed in a 500-mL glass vessel, and was stored by allowing it to stand for one month at room temperature. The conditions of the carbon filler-dispersed coating formulation after the storage were visually observed, and were evaluated in accordance with the below-described standards. A carbon filler-dispersed coating formulation was evaluated as "A" when neither the formation of a supernatant or the precipitation of a filler were observed. A carbon filler-dispersed coating formulation was evaluated as "B" when the formation of a supernatant and the precipitation of the filler were observed but the filler was redispersed when the vessel was lightly shaken. A carbon filler-dispersed coating formulation was evaluated as "C" when the formation of a supernatant and the precipitation of the filler were observed, the filler was not redispersed when agitated to such an extent as the vessel was lightly shaken, and redispersion by a disperser was needed. The evaluation results are shown in Table 2.

Working Application Examples 2 to 10, Comparative Application Example 1

Carbon filler-dispersed coating formulations were prepared in a similar manner as in Working Application Example 1 except that the dispersants and carbon fillers described below in Table 2 were used in place of the dispersant and carbon filler used in Working Application Example 1. The dispersibility and storage stability of each of the resulting coating formulations were then evaluated in a similar manner as in Working Application Example 1. The results are shown below in Table 2.

TABLE 2

| | Carbon Filler-dispersed Coating Formulations | | | | | |
|---|---|---|---|---|---|---|
| | In 100 parts of carbon filler-dispersed coating formulation | | | | | |
| | Dispersant | | Carbon filler | | Dispersi- | Storage |
| | Kind | Parts | Kind | Parts | bility | stability |
| Working Appln. Ex. 1 | Ex. 3 | 90 | FB | 10 | Good | B |
| Working Appln. Ex. 2 | Ex. 1 | 80 | AB | 20 | Good | A |
| Working Appln. Ex. 3 | Ex. 2 | 85 | AB | 15 | Good | A |
| Working Appln. Ex. 4 | Ex. 4 | 90 | AB | 10 | Good | B |
| Working Appln. Ex. 5 | Ex. 5 | 95 | KB | 5 | Good | A |
| Working Appln. Ex. 6 | Ex. 6 | 98 | CNT | 2 | Good | B |
| Working Appln. Ex. 7 | Ex. 7 | 92 | FB | 8 | Good | B |

TABLE 2-continued

Carbon Filler-dispersed Coating Formulations

In 100 parts of carbon filler-dispersed coating formulation

| | Dispersant | | Carbon filler | | Dispersi- | Storage |
|---|---|---|---|---|---|---|
| | Kind | Parts | Kind | Parts | bility | stability |
| Working Appln. Ex. 8 | Ex. 8 | 90 | AB | 10 | Good | A |
| Working Appln. Ex. 9 | Ex. 9 | 95 | AB | 5 | Good | B |
| Working Appln. Ex. 10 | Ex. 10 | 90 | AB | 10 | Good | A |
| Comp. Appln. Ex. 1 | Comp. Ex. 1 | 95 | FB | 5 | Bad | C |

FB: Furnace black ("TOKA BLACK #4500", product of Tokai Carbon Co., Ltd.)
AB: Acetylene black ("DENKA BLACK HS-100", product of Denki Kagaku Kogyo Kabushiki Kaisha)
KB: Ketjenblack ("ECP600JD", product of Lion Corporation)
CNT: Carbon nanotubes (multilayer type, diameter: 10 to 20 nm, length: 5 to 15 μm, product of Tokyo Chemical Industry Co., Ltd.)

Application Example 20

Charged in a 250-mL plastic container were carbon nanotubes (CNT) [multilayer type, diameter: 10 to 20 nm, length: 5 to 15 μm, product of Tokyo Chemical Industry Co., Ltd.] (0.3 g), the dispersant of Example 2 (5 g), water (75 g), IPA (20 g), and zirconia beads (diameter: 0.8 mm) (500 g). On a paint shaker, the carbon nanotubes were dispersed for 2 hours to obtain a CNT-dispersed, coating formulation. The coating formulation obtained as described above was applied by a bar coater onto a PET film (thickness: 0.1 μm, A4 size) to give a dry coat weight of 0.3 g/m². The thus-coated PET film was dried by a fan at 180° C. for 2 minutes to provide the PET film with a thin CNT film.

A cellophane tape peel test was performed on the thus-obtained PET film. The thin CNT film was free from peeling, and had good adhesiveness. The same untreated PET film as that used above, on which the formation of a thin film had not been conducted, and the above-obtained PET film provided with the thin CNT layer were then separately measured for surface resistivity by using a "HIRESTA-UP MCP-HT450" (manufactured by Mitsubishi Chemical Analytech Co., Ltd.). As a result, the untreated PET film was higher than $10^{14} \Omega/\square$ while the treated PET film was $2.3 \times 10^{6} \Omega/\square$. Compared with the untreated PET film, the treated PET film was hence lower in resistivity. From the foregoing, the dispersant of Example of the present invention can be considered to be also effective for application to antistatic films and the like.

Preparation of Various Hydroxyalkyl Chitosan Solutions

The compositions of the non-water-based and water-based hydroxyalkyl chitosan solutions used in example and comparative example are shown in Table 3.

As abbreviations for the organic acids, 1,2,3,4-butanetetracarboxylic acid will be abbreviated as "BTC", and 1,2,3,4,5,6-cyclohexanehexacarboxylic acid will be abbreviated as "CHHC". Concerning the polar solvents used in the various polymer solutions, on the other hand, dimethyl sulfoxide will be abbreviated as "DMSO" and the remaining polar solvents will be abbreviated as mentioned above.

Example 11

Hydroxyethyl chitosan (HA modification degree: 1.2, MW: 80,000; 5 parts) was dispersed in DMSO (93 parts) as a non-aqueous medium. Subsequent to the addition of CHHC (2 parts) to the dispersion, the resulting mixture was stirred at 50° C. for 2 hours to achieve dissolution, so that a solution of hydroxyethyl chitosan (100 parts) was prepared.

Examples 12 to 16

The hydroxyalkyl chitosan solutions of the respective examples were prepared in a similar manner as in Example 11 except that the kind and content (mass) of the hydroxyalkyl chitosan, the kind and content of the organic acid and the kind and content of the polar solvent were varied as shown in Table 3.

TABLE 3

Hydroxyalkyl Chitosan Solutions

| | Hydroxyalkyl chitosan | | | | Organic acid | | Polar solvent | |
|---|---|---|---|---|---|---|---|---|
| | | HA | | | | | | |
| | Kind | modf. deg. | MW | parts | Kind | parts | Kind | parts |
| Ex. 11 | Hydroxyethyl chitosan | 1.2 | 80,000 | 5 | CHHC | 2 | DMSO | 93 |
| Ex. 12 | Dihydroxypropyl chitosan | 1.6 | 120,000 | 5 | Pyromellitic acid | 5 | NMP | 90 |
| Ex. 13 | Dihydroxypropyl chitosan | 1.1 | 90,000 | 10 | BTC | 10 | Water | 80 |
| Ex. 14 | Dihydroxypropyl chitosan | 1.1 | 90,000 | 5 | BTC | 5 | Water/IPA = 90/10 | 90 |

TABLE 3-continued

Hydroxyalkyl Chitosan Solutions

| | Hydroxyalkyl chitosan | | | Organic acid | | Polar solvent | |
|---|---|---|---|---|---|---|---|
| | HA | | | | | | |
| | Kind | modf. deg. | MW | parts Kind | parts | Kind | parts |
| Ex. 15 | Dihydroxypropyl chitosan | 1.1 | 90,000 | 5 Pyromellitic acid | 5 | Water | 90 |
| Ex. 16 | Dihydroxypropyl chitosan | 1.6 | 120,000 | 5 Pyromellitic acid | 3 | Water/EtOH = 50/50 | 92 |

Preparation and Evaluation of Carbon Filler-Dispersed Coating Formulations

Application Example 11

Using as a dispersant the non-water-based, hydroxyalkyl chitosan solution (Table 3, Example 11) prepared beforehand, a carbon filler-containing coating formulation was prepared in a manner to be described hereinafter. Acetylene black as a carbon filler and the hydroxyalkyl chitosan solution were stirred and mixed at a mixing ratio of 7 parts to 93 parts at a rotational speed of 60 rpm for 120 minutes in a planetary mixer to obtain a slurry-form coating formulation.

Using the coating formulation obtained as described above and employing, as a substrate, a collector formed of a 20-μm thick aluminum foil, the coating formulation was applied onto one side of the substrate by a comma roll coater. After the coating, the coated substrate was dried for 2 minutes in an oven controlled at 110° C., and was further dried for 2 minutes in the oven controlled at 180° C. to eliminate the solvent and to have the hydroxyalkyl chitosan component crosslinked, so that a coating film was formed with a dry thickness of 1 μm on the collector.

Parallel lines, which consisted of perpendicularly-intersecting 11 vertical lines and 11 horizontal lines, were drawn by a cutter at intervals of 1 mm on the coating film layer obtained as described above so that 100 squares were formed within 1 cm². A mending tape was applied to the surface of the coating film layer, and tape peeling was then conducted. The number of squares which were not peeled off was determined as a measure of adhesiveness to the collector. The average of 10 tests was 97 squares. Further, the conditions of the coating film layer were observed after the coating film layer with the squares formed thereon as described above was immersed at 70° C. for 72 hours in a solution prepared by dissolving LiPF$_6$ (1 mole) as a supporting salt in a mixed solvent of EC (ethylene carbonate), PC (propylene carbonate) and DME (dimethoxyethane) combined together at a volume ratio of 1:1:2. One developed no changes is indicated as "none" under "solubility/swellability", while one with its coating film layer having been peeled or swollen is indicated as "equipped" under "solubility/swellability". The evaluation results are shown in Table 4.

Also to evaluate the electrical conductivity of the coating film layer, the coating formulation was applied onto a glass plate by a comma roll coater, and the thus-coated glass plate was then dried for 1 minute in an oven controlled at 200° C. to form a conductive coating film (dry thickness: 4 μm).

The surface resistivity of the resultant coating film was determined by the four-point probe method in accordance with JIS K 7194. The measurement was conducted under the conditions of 25° C. and 60% relative humidity by using a "LORESTA-GPMCP-T610" (manufactured by Mitsubishi Chemical Analytech Co., Ltd.).

Working Application Examples 12 to 16

Coating films were prepared in a similar manner as in Working Application Example 11 except that the hydroxyalkyl chitosan solutions described in Table 4 were used respectively in place of the hydroxyalkyl chitosan solution of Example 11. The adhesiveness, solubility/swellability and surface resistivity of each resulting coating film were then determined, and the results described in Table 4 were obtained. As shown in Table 4, it has been confirmed that a hydroxyalkyl chitosan solution according to the present invention can disperse a carbon filler in a good state, and at the same time, has good film-forming ability owing to crosslinking of the hydroxyalkyl chitosan component.

TABLE 4

| Working Application Example | Hydroxyalkyl chitosan solution | Content* | Adhesiveness (av. value) | Solubility/ Swellability | Surface resistivity (Ω/□) |
|---|---|---|---|---|---|
| 11 | Example 11 | 5 | 97 | None | 620 |
| 12 | Example 12 | 5 | 100 | None | 370 |
| 13 | Example 13 | 5 | 99 | None | 290 |
| 14 | Example 14 | 5 | 100 | None | 420 |
| 15 | Example 15 | 5 | 99 | None | 450 |
| 16 | Example 16 | 5 | 100 | None | 510 |

*Content of resin per 100 parts of coating formulation (parts: solids content)

Application to Cells

Working Application Example 17

Positive Electrode Plate, Negative Electrode Plate, Cell (Positive Electrode Plate)

A positive electrode formulation with a positive-electrode active material contained therein was prepared in a manner to be described hereinafter. As materials for the positive electrode formulation, LiCoO$_2$ powder having particle sizes of from 1 to 100 μm, acetylene black as a conductive aid and a 5% solution of polyvinylidene fluoride as a binder in NMP (PVDF solution) were used at a mixing ratio of 90 parts, 5 parts and 50 parts. They were then stirred and mixed at a rotational speed of 60 rpm for 120 minutes in a planetary mixer to obtain a slurry-form, positive electrode formulation with the positive-electrode active material contained therein.

Using the positive electrode formulation obtained as described above, the positive electrode formulation was applied by a comma roll coater onto the surface of the coating film layer of Working Application Example 12. The thus-coated positive electrode collector was then dried for 2 minutes in an oven controlled at 110° C., and was further dried for 2 minutes in the oven controlled at 180° C. to eliminate the solvent, so that a positive-electrode composite layer with an active material layer formed with a dry thickness of 100 μm on the coating film layer was obtained. The positive-electrode composite layer obtained in the above-described manner was pressed under the condition of 5,000 kgf/cm² to make the layer uniform. Aging was then conducted for 48 hours in a vacuum oven controlled at 80° C. to fully eliminate volatiles (the solvent, unreacted polybasic acid, etc.) so that a positive electrode plate was obtained.

(Negative Electrode Plate)

Using the coating formulation of Working Application Example 12 and employing, as a substrate, a copper-foil collector, the coating formulation was applied onto one side of the substrate by a comma roll coater. The thus-coated substrate was then dried for 2 minutes in an oven controlled at 110° C., and was further dried for 2 minutes in the oven controlled at 180° C. to eliminate the solvent and to have the resin binder crosslinked, so that a coating film layer was formed with a dry thickness of 1 μm on the collector.

Next, a negative electrode formulation with a negative-electrode active material contained therein was prepared in a manner to be described hereinafter. As materials for the negative electrode formulation, carbon powder obtained by thermally decomposing coal coke at 1,200° C., acetylene black as a conductive aid and the 5% solution of polyvinylidene fluoride as a binder in NMP (the PVDF solution) were used at a mixing ratio of 90 parts, 5 parts and 50 parts. They were stirred and mixed at a rotational speed of 60 rpm for 120 minutes in a planetary mixer to obtain a slurry-form, negative electrode formulation with the negative-electrode active material contained therein.

Using the negative electrode formulation obtained as described above, the negative electrode formulation was applied by a comma roll coater onto the surface of the coating film layer. The thus-coated negative electrode collector was then dried for 2 minutes in an oven controlled at 110° C., and was further dried for 2 minutes in the oven controlled at 180° C. to eliminate the solvent, so that a negative-electrode composite layer with an active material layer formed with a dry thickness of 100 μm on the coating film layer was obtained. The negative-electrode composite layer obtained in the above-described manner was pressed under the condition of 5,000 kgf/cm² to make the layer uniform. Aging was then conducted for 48 hours in a vacuum oven controlled at 80° C. to fully eliminate volatiles (the solvent, unreacted polybasic acid, etc.) so that a negative electrode plate was obtained.

(Cell)

An electrode unit was first formed by using the positive electrode plate and negative electrode plate, which had been obtained as described above, and rolling them into a volute form with a separator interposed therebetween. The separator was made of a porous polyolefin (polypropylene, polyethylene or a copolymer thereof) film having a width broader than the positive electrode plate and a three-dimensional porous (spongy) structure. The electrode unit was then inserted into a bottomed cylindrical, stainless steel can, which would also serve as a negative electrode terminal, so that a cell of the AA size and 500 mAh rated capacity was assembled. Charged as an electrolyte into the cell was a solution of 1 mole of $LiPF_6$ as a supporting salt in a mixed solvent prepared by combining EC (ethylene carbonate), PC (propylene carbonate) and DME (dimethoxyethane) at a volume ratio of 1:1:2 to give a total volume of 1 liter.

For the measurement of cell characteristics, charge-discharge characteristics were measured under a temperature condition of 25° C. by a charge-discharge measuring instrument as will be described below. Twenty (20) cells were respectively charged at a current value of 0.2 CA charging current, firstly in a charging direction until the cell voltage reached 4.1 V. After a break of 10 minutes, the cells were discharged at the same current until the cell voltage dropped to 2.75 V. Subsequent to a break of 10 minutes, charging and discharging were then repeated 100 cycles under the same conditions to measure charge-discharge characteristics. When the charge-discharge capacity in the $1^{st}$ cycle was assumed to be 100, the charge-discharge capacity in the $100^{th}$ cycle ("charge-discharge capacity retention") was 97%.

Working Application Examples 18 and 19

(Positive Electrode Plates, Negative Electrode Plates, Cells)

In a similar manner as in Working Application Example 17 except that the coating formulations and coating films described below in Table 5 were used in place of the coating formulation and coating film of Working Application Example 12 employed for the production of the positive electrode plate and negative electrode plate used in Working Application Example 17, electrode plates were produced and cells were manufactured, and the respective cells were measured for charge-discharge characteristics. The results are shown in Table 5.

TABLE 5

Charge-discharge Characteristics of Electrode Plates

| Working Appln. Ex. | Coating film employed for the production of positive electrode plate | Coating formulation employed for the production of negative electrode plate | Charge-discharge capacity retention |
|---|---|---|---|
| 17 | Film of Working Appln. Ex. 12 | Formulation of Working Appln. Ex. 12 | 97% |
| 18 | Film of Working Appln. Ex. 13 | Formulation of Working Appln. Ex. 13 | 98% |
| 19 | Film of Working Appln. Ex. 14 | Formulation of Working Appln. Ex. 14 | 99% |

[Application to Capacitors]

Working Application Example 20

Capacitor

Using the coating formulation of Working Application Example 12 and employing, as a substrate, a collector formed of a 20-μm thick aluminum foil, the coating formulation was applied onto one side of the substrate by a comma roll coater. After the coating, the coated substrate was dried for 2 minutes in an oven controlled at 110° C. The coated substrate was further dried for 2 minutes in the oven controlled at 180° C. to eliminate the solvent and to have the resin binder crosslinked, so that a coating film layer was formed with a dry thickness of 0.5 μm on the collector.

An electrode formulation with an active material contained therein was next prepared in a manner to be described hereinafter. As materials for the electrode formulation, high-purity activated carbon powder (specific surface area: 1,500 m²/g, average particle size: 10 μm; 100 parts) and acetylene black (8 parts) as a conductive material were charged in a planetary mixer, and the solution of polyvinylidene fluoride in PVDF was added to give a total solids concentration of 45%, followed by mixing for 60 minutes. Subsequently, the mixture was diluted with NMP to a solids concentration of 42%, followed by further mixing for 10 minutes to obtain an electrode formulation. Using a doctor blade, the electrode formulation was applied onto the coating film layer, followed by drying at 80° C. for 30 minutes in a fan dryer. Using a roll press, pressing was then conducted to obtain a polarizable, capacitor electrode plate having a thickness of 80 μm and a density of 0.6 g/cm$^3$.

From the polarizable, capacitor electrode plate produced as described above, two discs were cut out with a diameter of 15 mm. Those discs were dried at 200° C. for 20 hours. Those two electrode discs were arranged with their electrode layer sides opposing each other, and a cellulose-made, disc-shaped separator of 18 mm in diameter and 40 μm in thickness was held between the electrode discs. The thus-obtained electrode unit was placed in a coin-shaped case made of stainless steel (diameter: 20 mm, height: 1.8 mm, stainless steel thickness: 0.25 mm) and equipped with a polypropylene-made packing. An electrolyte was charged into the case such that no air was allowed to remain. A 0.2-mm thick stainless steel cap was put and fixed on the case with the polypropylene-made packing interposed therebetween. The case was then sealed to produce a coin-shaped capacitor of 20 mm in diameter and about 2 mm in thickness. As the electrolyte, a solution with tetraethylammonium tetrafluoroborate dissolved at a concentration of 1 mole/L in propylene carbonate was employed. The capacitor obtained as described above was measured for capacitance and internal resistance. The results are shown in Table 6.

Working Application Examples 21 and 22

Capacitors

In a similar manner as in Working Application Example 20 except that the coating formulations described in Table 6 were used in place of the coating formulation of Working Application Example 12 employed in Working Application Example 20, electrode plates were produced and capacitors were manufactured, and the characteristics of the respective capacitors were evaluated. The results are shown in Table 6.

Comparative Application Example 2

In a similar manner as in Working Application Example 20 except that the coating formulation of Comparative Application Example 1 was used in place of the coating formulation of Working Application Example 12 employed in Working Application Example 20, an electrode plate was produced and a capacitor was manufactured, and the characteristics of the respective capacitor were evaluated. The results are shown in Table 6.

The internal resistances and capacitances in Table 6 were measured and evaluated as will be described next. The thus-obtained capacitors were each measured for capacitance and internal resistance at a current density of 20 mA/cm$^2$. Based on Comparative Application Example 2 as a reference, those capacitance and internal resistance were evaluated in accordance with the below-described evaluation standards. The greater the capacitance and the lower the internal resistance, the better the performance as a capacitor.

(Evaluation Standards for Capacitance)

A: Capacitance greater by 20% or more than Comparative Application Example 2.

B: Capacitance greater by 10% or more but less than 20% than Comparative Application Example 2.

C: Capacitance equal to or smaller than Comparative Application Example 2.

(Evaluation Standards for Internal Resistance)

A: Internal resistance lower by 20% or more than Comparative Application Example 2.

B: Internal resistance lower by 10% or more but less than 20% than Comparative Application Example 2.

C: Internal resistance equal to or higher than Comparative Application Example 2.

TABLE 6

Electrical Characteristics of Electrode Plates

| Working Appln. Ex. | Coating formulation employed for the production of polarizable electrode plate | Capacitance | Internal resistance |
|---|---|---|---|
| Ex. 20 | Coating formulation of Working Appln. Ex. 12 | A | A |
| Ex. 21 | Coating formulation of Working Appln. Ex. 13 | A | A |
| Ex. 22 | Coating formulation of Working Appln. Ex. 14 | A | A |
| Comp. Appln. Ex. 2 | Coating formulation of Comp. Appln. Ex. 1 | — | — |

As evident from the above working application examples and comparative application example, a capacitor of large capacitance and low internal resistance can be obtained when electrode plates having coating films formed from a coating formulation making use of a hydroxyalkyl chitosan solution, which acts as a dispersant according the present invention, are produced, and the capacitor is manufactured using the electrode plates.

INDUSTRIAL APPLICABILITY

As has been described above, the present invention can provide a dispersant, which exhibits high dispersing ability for a carbon filler and high stability for a carbon filler dispersion, owing to the use of a hydroxyalkyl chitosan, such as glycerylated chitosan, equipped with an excellent dispersing function. Further, the preparation of a coating formulation, in which the dispersant and carbon filler are dispersed in a water-based medium or non-water-based medium, can provide a carbon filler-dispersed coating formulation having good film-forming ability because the dispersant is equipped with high dispersing ability and dispersion stability and also functions as a binder for the carbon filler. Still further, the application of this coating formulation can form a carbon filler-containing composite material with the carbon filler effectively dispersed therein, so that the functionality which the carbon filler has, such as electrical conductivity, can be fully exhibited. Furthermore, the application of this coating formulation onto various substrates such as metals, resins, ceramics, paper, fibers and glass can also provide conductive composite materials of excellent performance that the conductivity which the carbon filler has is effectively exhibited.

The invention claimed is:

1. A carbon filler dispersant for dispersing stably a carbon filler in a liquid medium comprising:
an aqueous solvent or a nonaqueous solvent, comprising a hydroxyalkyl chitosan,
wherein the hydroxyalkyl chitosan has weight average molecular weight from 2,000 to 350,000, and
the dispersant disperses the carbon filler uniformly, so that the dispersant dispersing the carbon filler forms a uniform film when applied on a glass, and the dispersant maintains a uniform dispersion state of the carbon filler in the dispersant after being stored for one month at room temperature.

2. The carbon filler dispersant according to claim 1, wherein the hydroxyalkyl chitosan comprises at least one hydroxyalkyl chitosan selected from the group consisting of glycerylated chitosan, hydroxyethyl chitosan, hydroxypropyl chitosan, hydroxybutyl chitosan, and hydroxybutyl hydroxypropyl chitosan.

3. The carbon filler dispersant according to claim 1, wherein the hydroxyalkyl chitosan has a hydroxyalkylation degree of 0.5 or higher but 4 or lower.

4. The carbon filler dispersant according to claim 1, further comprising, as an additive, an organic acid or a derivative thereof in an amount of from 0.2 to 3 parts by mass per parts by mass of the hydroxyalkyl chitosan.

5. The carbon filler dispersant according to claim 1, wherein the carbon filler comprises at least one carbon filler selected from the group consisting of carbon black, acetylene black, furnace black, natural graphite, artificial graphite, amorphous carbon, hard carbon, soft carbon, activated carbon, carbon nanofibers, carbon nanotubes and fullerene.

6. A stable carbon filler dispersion, comprising:
an aqueous solvent or a nonaqueous solvent;
a hydroxyalkyl chitosan; and
a carbon filler,
wherein the hydroxyalkyl chitosan has weight average molecular weight from 2,000 to 350,000, and
the carbon filler dispersion disperses the carbon filler uniformly in the dispersion, so that the carbon filler dispersion forms a uniform film when applied on a glass and maintains a uniform dispersion state of the carbon filler in the carbon filler dispersion after being stored for one month at room temperature.

7. The stable carbon filler dispersion according to claim 6, wherein the hydroxyalkyl chitosan comprises at least one hydroxyalkyl chitosan selected from the group consisting of glycerylated chitosan, hydroxyethyl chitosan, hydroxypropyl chitosan, hydroxybutyl chitosan, and hydroxybutyl hydroxypropyl chitosan.

8. The stable carbon filler dispersion according to claim 6, wherein the hydroxyalkyl chitosan has a hydroxyalkylation degree of 0.5 or higher but 4 or lower.

9. The stable carbon filler dispersion according to claim 6, further comprising, as an additive, an organic acid or a derivative thereof in an amount of from 0.2 to 3 parts by mass per parts by mass of the hydroxyalkyl chitosan.

10. The stable carbon filler dispersion according to claim 6, wherein the carbon filler comprises at least one carbon filler selected from the group consisting of carbon black, acetylene black, furnace black, natural graphite, artificial graphite, amorphous carbon, hard carbon, soft carbon, activated carbon, carbon nanofibers, carbon nanotubes and fullerene.

11. A method of stabilizing a carbon filler in a dispersion, comprising:
adding a carbon filler to a dispersant comprising an aqueous solvent or a nonaqueous solvent and a hydroxyalkyl chitosan; and
mixing the dispersant and the carbon filler so as to form the carbon filler dispersion,
wherein the hydroxyalkyl chitosan has weight average molecular weight from 2,000 to 350,000, and
the carbon filler dispersion disperses the carbon filler uniformly in the dispersant, so that the carbon filler dispersion forms a uniform film when applied on a glass and maintains a uniform dispersion state of the carbon filler in the carbon filler dispersion after being stored for one month at room temperature.

12. The method according to claim 11, wherein the hydroxyalkyl chitosan comprises at least one hydroxyalkyl chitosan selected from the group consisting of glycerylated chitosan, hydroxyethyl chitosan, hydroxypropyl chitosan, hydroxybutyl chitosan, and hydroxybutyl hydroxypropyl chitosan.

13. The method according to claim 11, wherein the hydroxyalkyl chitosan has a hydroxyalkylation degree of 0.5 or higher but 4 or lower.

14. The method according to claim 11, the carbon filler dispersant further comprising, as an additive, an organic acid or a derivative thereof in an amount of from 0.2 to 3 parts by mass per parts by mass of the hydroxyalkyl chitosan.

15. The method according to claim 11, wherein the carbon filler comprises at least one carbon filler selected from the group consisting of carbon black, acetylene black, furnace black, natural graphite, artificial graphite, amorphous carbon, hard carbon, soft carbon, activated carbon, carbon nanofibers, carbon nanotubes and fullerene.

* * * * *